United States Patent [19]
Boegli

[11] Patent Number: 5,598,774
[45] Date of Patent: Feb. 4, 1997

[54] DEVICE FOR THE TREATMENT OF FLAT MATERIALS

[75] Inventor: Charles Boegli, Marin, Switzerland

[73] Assignee: Boegli - Gravures S.A., Marin, Switzerland

[21] Appl. No.: 449,819

[22] Filed: May 24, 1995

[30] Foreign Application Priority Data

Jun. 6, 1994 [CH] Switzerland .................. 01769/94

[51] Int. Cl.⁶ .................................................. B30B 3/04
[52] U.S. Cl. .................................... 100/170; 100/171
[58] Field of Search ........................... 100/168–171

[56] References Cited

U.S. PATENT DOCUMENTS

| | | | |
|---|---|---|---|
| 1,228,178 | 5/1917 | Brooker | 100/171 |
| 2,345,321 | 3/1944 | Brown | 384/202 |
| 2,355,507 | 8/1944 | Brown | 100/171 |
| 2,832,280 | 4/1958 | Hold et al. | 100/170 |
| 3,572,570 | 3/1971 | Mortensen | 100/170 |
| 3,598,457 | 8/1971 | Sejeck | 384/519 |
| 4,714,360 | 12/1987 | Petros | 384/620 |
| 4,817,407 | 4/1989 | Alich | 100/170 |
| 5,261,324 | 11/1993 | Jakobs et al. | 100/170 |

FOREIGN PATENT DOCUMENTS

| | | | |
|---|---|---|---|
| 1309022 | 10/1962 | France . | |
| 3007112 | 9/1981 | Germany . | |
| 181599 | 11/1962 | Sweden | 100/169 |
| 890344 | 2/1962 | United Kingdom . | |

OTHER PUBLICATIONS

Unpublished Switzerland patent application 03 102/93.

*Primary Examiner*—Stephen F. Gerrity
*Attorney, Agent, or Firm*—Marks & Murase L.L.P.

[57] ABSTRACT

Two rolls, more particularly embossing rolls are provided which are pressed against each other by pneumatic cylinders for the purpose of fashioning a flat material passing between the rolls. The ends of one of the roll axles are journalled in slides which are actuatable by the cylinders in such a manner as to be deflectable in the pressure direction and in the travelling direction of the material. The elastically suspended roll is thus capable of automatically adjusting itself in such a manner that the axles of the two rolls can adjust to irregularities of the flat material and thus allow a disturbance-free and qualitatively optimal treatment of the material.

9 Claims, 1 Drawing Sheet

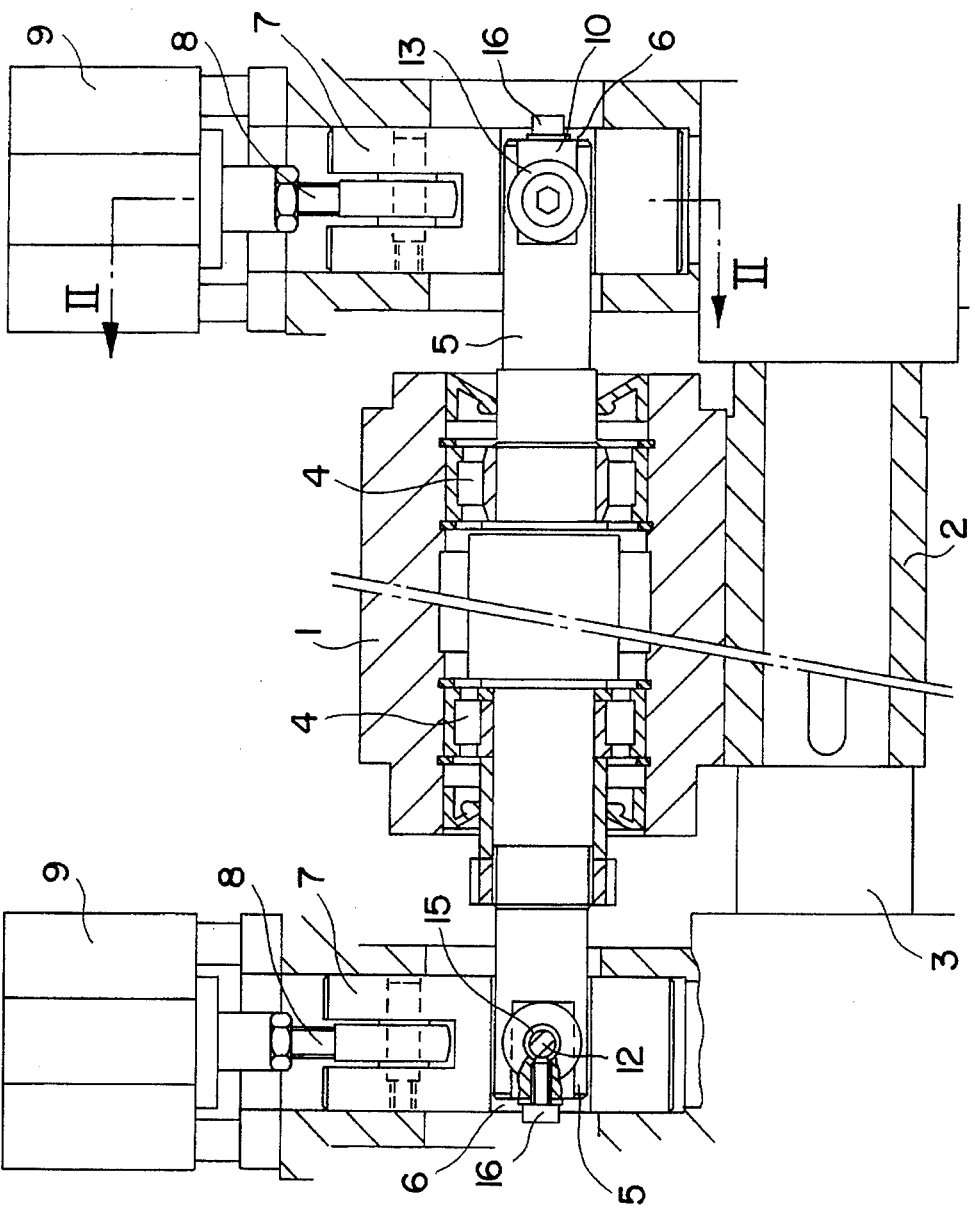
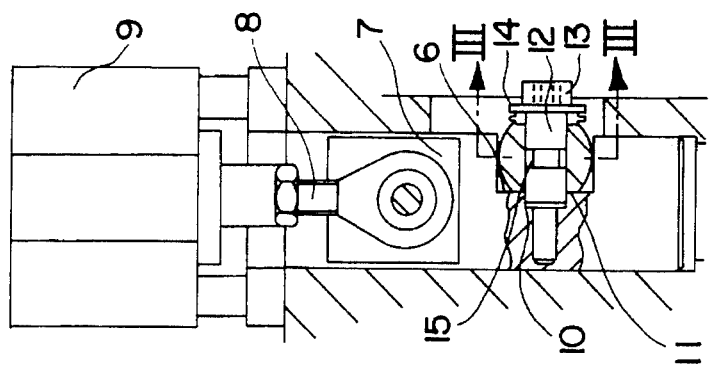
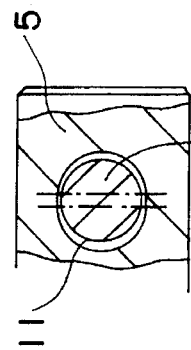

DEVICE FOR THE TREATMENT OF FLAT MATERIALS

BACKGROUND OF THE INVENTION

The present invention refers to a device for the treatment of flat materials, more particularly for embossing or calendering foils of paper, metal, or a combination of these materials, comprising at least a pair of cylinders between which the flat material is passed under pressure. Devices of this kind are commonly used for calendering and/or embossing packaging films. In this process, embossing rolls, in particular, have to be pressed against each other with a relatively high pressure in order to obtain the desired deformation resp. structure of the flat materials. Swiss Patent Application No. 03 102/93 refers to a method for fashioning flat materials in which the flat material is calendered on its entire surface in a first step and locally flattened in a second step, in such a manner that flat, glossy aeras in the form of emblems, trademarks or the like appear on the calendered material. The embossing rolls for this or for similar treatments of flat materials have to be pressed against each other with a relatively high pressure, resulting in a risk of an uneven effect of the pair of rolls on the flat material. This high pressure may result in the material becoming jammed or folded if the axes of the rolls are not adjusted to each other in such a manner that they exert an even pressure across the entire width of the flat material independently of irregularities of the material such as transversal differences in thickness of a paper web. However, adjustment errors of the calendering or embossing rolls may also result from the tolerances of the machine. Also, deviations from the correct mutual position of the roll axles in the travelling direction of the flat material, perpendicular to the direction of the roll pressure acting on the flat material, are quite common. Adjustment errors of this kind also lead to quality defects and to a considerable reduction of the lifetime of the rolls, especially in the case of calendering or embossing rolls having interlocking calendering or embossing members, respectively. Until now, in order to prevent such errors, the operation of the rolls had to be continuously monitored and manually readjusted if necessary. These adjustments require highly experienced personnel, on one hand, and lead to machine downtime, on the other.

SHORT DESCRIPTION OF THE INVENTION

It is an object of the present invention to design a device of the above-mentioned kind in such a manner that an automatic adjustment of the rolls of a pair is effected. Also, a further object is to ensure that defects of the product, an excessive wear of the rolls, and downtimes are prevented without the need for a continuous monitoring of the installation. These objects are attained by a device for the treatment of flat materials wherein the bearing of at least one of the rolls (1) of the pair is supported in the machine frame in the direction of the pressure and/or in the travelling direction of the flat material by means of flexible members in such a manner that a mutual flexible adjusting capacity of the roll axles in the pressure and in the travelling direction is provided. It has been found that the desired automatic adjustment of the roll axles and thus a dramatically improved product can be obtained by relatively simple and uncritical measures. Irregularities of the material as well as machine tolerances are thereby compensated for, and the stress acting upon the rolls is reduced, this increasing their lifetime. This applies especially for calendering rolls having fine toothings which interlock in operation as well as where the non-driven roll is driven along without an additional synchronizing gear. In this case, as well as in the case of embossing rolls, the flexible adjusting capacity of the roll axles allows an optimal mutual engagement of the surface structures of the rolls, whereby their operation is more easily initialized, and whereby increasing deviations from their optimal mutual adjustment in operation are prevented.

BRIEF DESCRIPTION OF THE DRAWINGS

The invention is now explained in more detail with reference to a concrete embodiment which is followed by some alternative embodiments.

FIG. 1 shows an axial cross-section of a pair of rolls;

FIG. 2 shows a partial cross-section according to line II—II in FIG. 1; and

FIG. 3 shows a partial cross-section according to line III—III in FIG. 2 on an enlarged scale.

DETAILED DESCRIPTION OF THE INVENTION

The represented device comprises two embossing rolls 1 and 2. The axle of embossing roll 2 is supported in machine frame 3 and may be coupled to a non-represented drive. Embossing roll 1 is journalled freely and rotatably on an axle 5 by means of ball-bearings 4. The ends of axle 5 each engage in grooves 6 of slides 7 which are vertically guided in the machine frame and are each connected by a connecting rod 8 to a pneumatic cylinder 9. The two pneumatic cylinders 9 provide an even pressure of roll 1 against roll 2.

Rather than being rigidly journalled, the ends of axle 5 are flexibly displaceable in slides 7. In the area of grooves 6, axles 5 are provided with a plane milling 10 which rests on the plane bottom of the groove, thus maintaining them in an unequivocal rotational position. Both ends of the axle are provided with a transversal bore 11 with a bolt 12 passing therethrough which is screwed to slide 7. Between the head 13 of each bolt and a concave, e.g. a spherical, surface of each axle end 5, a series of disk springs 14 are inserted which are restrained under a certain pressure between head 13 of bolt 12 and the end of axle 5. As shown in FIG. 3, bolt 12 engages in bore 11 with a certain amount of play, while it is indicated in FIG. 3 that said play is smaller in the vertical direction, in the direction of the roll pressure, than in the travelling direction of the material between the rolls. Under the action of disk springs 14, axle 5 is kept in a position in which bolts 12 engage in bores 11 of the axle ends with play on all sides, the play in the direction of the roll pressure and in the travelling direction being between 0 and 2 mm, for example. The possible flexible deviation of the axle is thus limited on both sides by a stop. For a mutual securing of bolts 12 and axle ends 5, bolts 12 are provided with an annular groove with a securing screw 16 engaging therein.

In operation, roll 1 is now capable of being flexibly deflected as soon as any irregularities occur. Tests have shown that the described construction allows to prevent failures and quality defects without any monitoring or interventions. The flexible suspension of axle 5 and the pressure of cylinders 9 are preferably dimensioned so that no relative movement between axle 5 and bolts 12 takes place at this pressure as long as no flat material is present between the rolls.

As mentioned, a given embodiment is represented in the drawing and described above, but different alternative embodiments are possible. In certain circumstances, none of the rolls might be driven. Alternatively, both rolls might be synchronously driven. It would also be conceivable to make each roll deflectable in one direction only, i.e. roll 1 in the travelling direction and roll 2 in the pressure direction. The flexible suspension could be realized in other ways. For example, it would be possible to design the two ends of axle 5 to be connected to flexible rods permitting a certain flexible bending. These rods could also have such a cross-section as to provide different elastic forces resp. deflections in the pressure direction and the travelling direction. In certain cases, none of the rolls need be driven. It is then sufficient to draw the flat material through the rolls. Even though calendering and embossing rolls are particularly mentioned above, the invention is not limited to such rolls, but it is applicable for any treatment of flat materials where analogous problems exist.

Instead of separate pneumatic cylinders 9 acting each upon a slide 7, a common cylinder might be provided which acts upon both slides by a yoke. The point of impact of the common cylinder on the yoke is displaceable in function of the width and position of the flat material. Also, instead of slides 7 which are guided in only one direction, compound slides might be provided, and the spring characteristics of the elastic elements acting on the compound slides in the pressure direction and in the travelling direction might be different from each other.

I claim:

1. A device for the treatment of flat materials comprising:

at least one pair of rolls, each roll having an axle; and a machine frame for supporting the axle of each of the rolls;

wherein the flat material is passed in a travelling direction between at least one pair of rolls under pressure; and wherein at least one of said axles is supported by means of flexible members in such a manner that a mutual flexible adjusting capacity of the axles is provided in both the pressure direction and in the travelling direction.

2. The device of claim 1, wherein the axle of one of said rolls of the roll pair is not supported by elastical-members, said one roll being driven.

3. The device of claim 1, wherein the axle of one of said rolls of the rolls pair is mounted in slides which are connected to a pressure drive.

4. A device for the treatment of flat materials comprising:

at least one pair of rolls, each roll having an axle; and a machine frame for supporting the axle of each of the rolls;

wherein the flat material is passed in a travelling direction between at least one pair of rolls under pressure;

wherein at least one of said axles is supported by means of flexible members in such a manner that a mutual flexible adjusting capacity of the axles is provided in both the pressure direction and in the travelling direction; and wherein stop means are provided to limit the adjusting capacity of the axles in the travelling direction and in the pressure direction to a value between 0 and 2 mm.

5. A device for the treatment of flat materials comprising:

at least one pair of rolls, each roll being rotatably journaled on an axle; and a machine frame for supporting the axle of each of the rolls;

wherein the flat material is passed in a travelling direction between at least one pair of rolls under pressure; and wherein at least one of said axles is supported by means of flexible members in such a manner that a mutual flexible adjusting capacity of the axles is provided in both the pressure direction and in the travelling direction.

6. The device of claim 5, wherein the ends of at least one of said axles are provided with transversal bores with bolts engaging therein with play, and springs acting onto said axle, wherein the ends of said axle are under the action of said springs in order to keep the walls of the transversal bores at a distance from the bolts.

7. The device of claim 6, wherein said flexible members as well as the pressure acting upon the rolls are so dimensioned that the roll axle is not moved relative to the bolt as long as no flat material is present between the rolls.

8. The device of claim 6, wherein said springs are convex disk springs disposed between the heads of the bolts and concave surfaces of the axle ends.

9. The device of claim 6, wherein the transversal bores have a non-circular cross-section which is larger in the travelling direction than in the pressure direction.

\* \* \* \* \*